Nov. 12, 1929.     A. M. JOHNSON     1,735,400
TOOL SPINDLE BRAKE MECHANISM
Filed Feb. 16, 1925
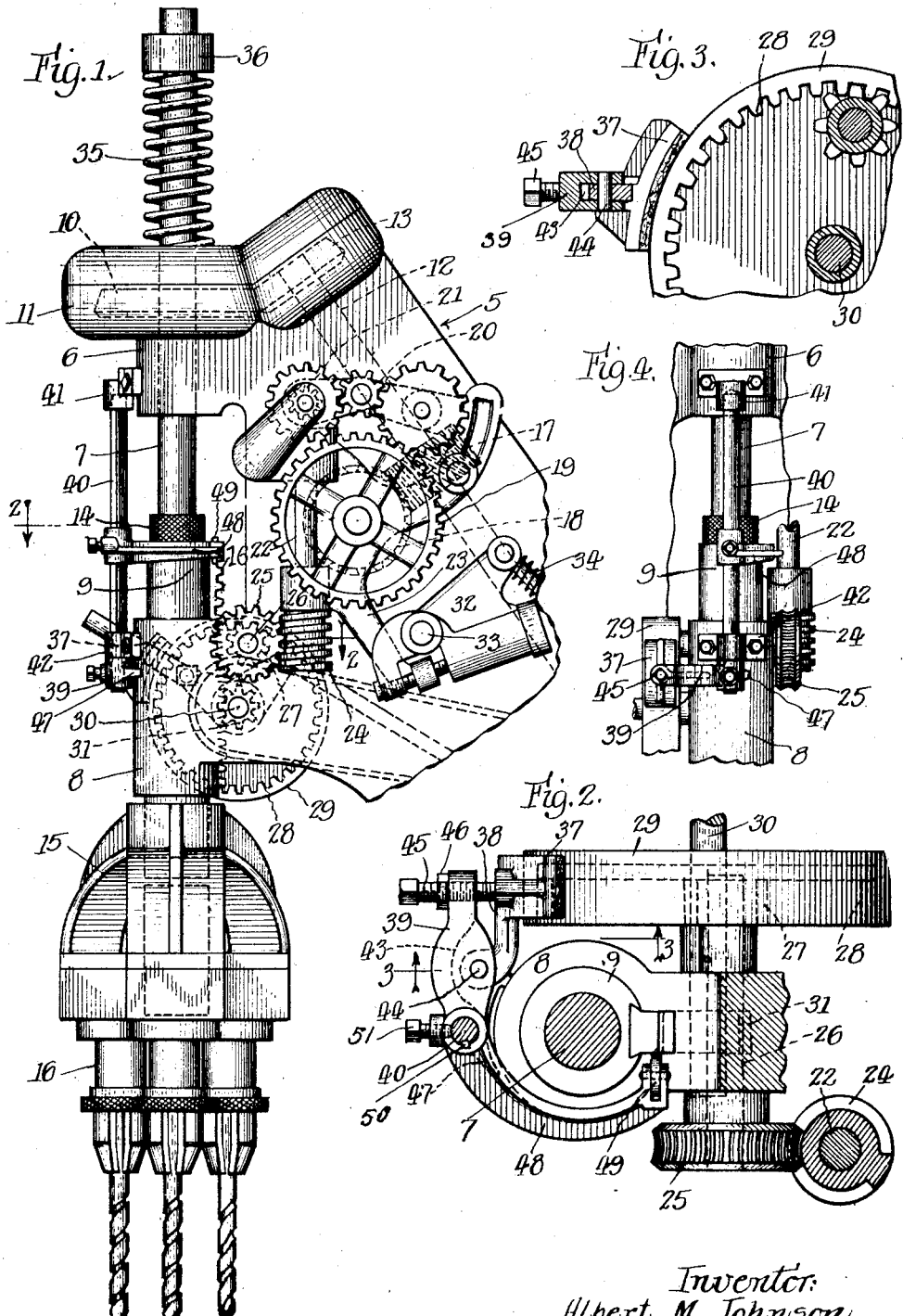
Inventor:
Albert M. Johnson Patented Nov. 12, 1929

1,735,400

UNITED STATES PATENT OFFICE

ALBERT M. JOHNSON, OF ROCKFORD, ILLINOIS, ASSIGNOR TO BARNES DRILL COMPANY, OF ROCKFORD, ILLINOIS, A CORPORATION OF ILLINOIS

TOOL-SPINDLE BRAKE MECHANISM

Application filed February 16, 1925. Serial No. 9,683.

The invention has general reference to a brake mechanism for the tool spindle of a drilling machine or the like and is especially applicable to machines of the type in which the tool spindle is mounted for up and down movements in a stationary tubular bearing or head with feed mechanism adapted to release the spindle at a predetermined point in its downward movement and means such as a spring for returning the spindle rapidly to raised position.

In machines of this type, the tool spindle usually carries a part or parts which when the spindle is released for upward movement would strike the framework of the machine a sharp blow under the action of the spindle returning means, unless otherwise restrained. It is the object of this invention to provide a brake mechanism for the spindle which is automatically operable in the upward movement of the spindle to arrest its travel at a predetermined point and thus avoid strain upon the parts due to an impact against the frame as set forth.

As ordinarily constructed the tool spindle of a drill press or other machine is permitted to return to a position away from the work which is the same regardless of the character of the work being operated upon. In some instances, therefore, the spindle in its return movement travels through a substantially greater distance than is necessary to clear the work for the purpose of removing and replacing the same. Consequently the downward feeding movement of the spindle is necessarily prolonged with a resulting waste of time and wear and tear upon the machine. An important object of my invention is to provide means which is readily adjustable to vary the length of stroke of the tool spindle in accordance with the character of the work, and operating to limit the return stroke of the tool spindle whereby to stop the spindle in its return movement at a point which is just sufficiently remote from the work to enable its insertion and removal.

A general object is to provide a brake device which is effectual in operation and which is simple in construction and capable of being manufactured economically.

In the accompanying drawings I have illustrated a preferred embodiment of my invention, but it is contemplated that various changes may be made in the construction and arrangement set forth by those skilled in the art without departing from the spirit and scope of the invention as expressed in the appended claims.

Figure 1 of the drawings is a fragmentary side elevational view of a drilling machine having my improved brake device applied thereto.

Fig. 2 is a fragmentary horizontal sectional view taken approximately in the plane of line 2—2 of Fig. 1, but on an enlarged scale.

Fig. 3 is a fragmentary vertical sectional view taken approximately in the plane of line 3—3 of Fig. 2.

Fig. 4 is a fragmentary front elevational view illustrating the brake device.

The machine selected for purposes of illustration comprises a frame generally designated by the numeral 5 having an upper bearing 6 through which the tool spindle 7 is vertically slidable. The frame also has a tubular head or bearing 8 in which is mounted for vertical sliding movement a sleeve 9 held against longitudinal movement on the spindle but permitting rotation of the spindle by means of a bevel gear 10 splined on the upper end of the spindle and enclosed within a housing 11 rigid with the frame 5. A driven shaft 12 communicating with a suitable source of power (not shown) has a bevel gear 13 thereon meshing with the gear 10.

14 designates a collar on the spindle forming part of the means for holding the sleeve 9 against longitudinal movement thereon. The lower end of the spindle is in the present instance shown as having secured thereto a head 15 carrying multiple drill spindles 16 operatively connected with the main spindle 7 in any usual or preferred manner.

The spindle sleeve 9 is equipped with the usual rack bar 16$^a$ upon its rear face forming part of the feed mechanism which in the present instance is arranged to be driven from the shaft 12. This feed mechanism comprises a worm 17 fast on the shaft 12 and meshing with a worm wheel 18 suitably journaled in the machine frame. Rigid with the worm wheel 18 is a spur gear 19 which is connected by a spur gear train 20 and bevel gearing 21 with a vertical shaft 22 journaled in a swinging bracket 23, the latter in turn being mounted on the axis of the gear 19. The lower end of said shaft 22 carries a worm 24 adapted to mesh with a worm wheel 25 on a countershaft 26 journaled in the frame of the machine. The opposite end of said countershaft on the side of the frame opposite the gear 25 has a pinion 27 meshing with an internal gear 28 formed integral with a drum 29 which constitutes a housing for the gearing at this side of the machine. The drum 29 is mounted upon a cross feed shaft 30 so as to rotate therewith and on said shaft is a pinion 31 meshing with the rack 16.

The bracket 23 is arranged to be swung to move the worm 24 into and out of engagement with the worm wheel 25 to control the operation of the spindle 7 by the feed mechanism.

Any suitable means may be employed for moving the bracket 23, including a rocker member 32 pivoted at 33 to the machine frame and operatively connected with the bracket 23 on the one hand and with a suitable rod 34 on the other hand connected with a suitable control mechanism (not shown). The feed mechanism as thus described is more fully set forth in my copending application Serial No. 623,632, now Patent No. 1,679,530, Aug. 7, 1928.

Downward movement of the spindle 7 occurs against the action of a coiled expansion spring 35 encircling the upper end of the spindle projection above the housing 11 and bearing at its upper end against a collar 36 fast upon the upper end of the spindle. The controlling means for the feed mechanism is operated when the spindle has been moved downwardly to a predetermined depth, to release the spindle to upward movement by the spring 35, through the disengagement of the worm 24 from the worm wheel 25.

It will be apparent that in such upward travel of the spindle the head 15 would, unless otherwise restrained, strike the bearing 8, or in the absence of a head 15, the collar 14 might strike the bearing 6. Since the spindle travels upwardly at a relatively high speed it is desirable to prevent any such impact against the frame.

Also it will be observed that unless restrained the spindle will, when released, travel upwardly through a fixed range of movement regardless of the character of the work being operated upon. In some instances this distance may be unnecessarily great, and the result is that the downward feeding movement must be prolonged unnecessarily.

The means which I have provided for limiting the return travel of the spindle for the purposes above set forth comprises a brake member or shoe 37 which is mounted to turn on a vertical axis for movement into and out of engagement with the outer periphery of the drum 29 constituting in addition to its other functions a brake drum. Herein the brake shoe is carried at one end of an arm 38 which in turn is carried by a member 39 fast upon a vertical shaft 40. The latter is journaled at its upper and lower ends (Fig. 4) in brackets 41 and 42 secured respectively to the bearings 6 and 8. As shown in Fig. 3, the member 39 is formed with a recess 43 on its inner or rear side to receive the arm 38 which is secured to the member 39 by means of a pin 44. The members 38 and 39 are held against relative movement by means of a screw 45 provided with a lock nut 46. This construction is provided to enable the brake shoe to be adjusted relative to the drum 29. Movement of the shoe away from the drum is limited by a stop member 47 rigid with the member 39 and adapted to engage the forward face of the bearing 8.

To move the brake shoe 37 into engagement with the drum 29 in the upward travel of the spindle I employ a cam means comprising a curved arm 48 secured at its forward end to the rod or shaft 40 and having at its rear end (Fig. 2) a roller 49 normally bearing against the side of the rack bar 16. The parts are so arranged that when the spindle is released for upward movement through the action of the spring 35, the upper end of the rack bar 16 engages with the roller 49, forcing the latter outwardly with a cam action, the roller having moved inwardly into a position above the bar as the spindle was fed downwardly. The result, it will be apparent, is that the arm 48 rocks the shaft 40 and with it the member 39 and arm 38 whereby to apply the shoe 37 to the periphery of the drum 29, arresting the travel of the spindle.

In order to adjust the machine so that the upward motion may be arrested without excess upward travel, the arm 48 is adjustably mounted on the shaft 40. Shaft 40 and the arm 48 are provided mutually with keyways and a common key indicated at 50 so that a splined relation obtains between them. An adjusting screw 51 is entered through the arm 48 in order to fix the same to shaft 40 in adjusted position. In Fig. 1 the roller 49 is shown in the position it occupies when upward motion is arrested.

It will be observed that the means for operating the brake device by the movement of the spindle, namely, the arm 48 operatively associated with the spindle sleeve rack and the rock shaft 40 carrying the brake member, constitutes in effect a lost motion connection between the spindle and the brake device, whereby at a predetermined point in the return movement of the spindle the brake device is operated.

The construction, it will be observed, is exceedingly simple in character and yet is very effectual in operation. Obviously it may be adjusted readily so as to bring the spindle to rest at any desired point in its upward travel.

I claim as my invention:

1. In a drilling machine or the like, the combination with a tool spindle mounted for reciprocation toward and from the work, means tending to restrain movement of the spindle toward the work, positively actuated means for feeding the spindle against the action of said restraining means but adapted to release the spindle at the end of the feeding stroke, said first mentioned means being operable to return said spindle to inoperative position when said spindle is released, and a brake mechanism operable in the return travel of the spindle to effect the gradual stoppage thereof, said brake mechanism comprising two relatively movable elements one movable in the return travel of the spindle, and an actuator for effecting a frictional engagement between said elements at a predetermined point in the return movement of said spindle.

2. In a drilling machine or the like, the combination of a tool spindle, feed mechanism for moving the spindle into engagement with the work and adapted to release the spindle at the end of the feeding movement, means acting upon such release of the spindle to return it rapidly to inoperative position, said feed mechanism having a rotary element associated therewith and operatively connected to said spindle for rotation during the return movement, a brake device, and means operable at a predetermined point in the return movement of the spindle to apply said device to said rotary element whereby to arrest the movement of the spindle.

3. In a drilling machine or the like, a tool spindle, feed mechanism adapted to release the spindle at the end of the feeding movement, means for returning the spindle rapidly, said feed mechanism including a rotary element and a rack bar synchronously movable with the spindle, a rock shaft, a brake member carried by the rock shaft and adapted to engage said rotary element, and an operating member also carried by the rock shaft and adapted to engage said rack bar in the return movement of the spindle whereby to move said brake member into engagement with the rotary element.

4. In a drilling machine, the combination of a tool spindle, a sleeve in which said spindle is journaled and mounted for vertical movements, a shaft extending transversely of said sleeve and having a gearing connection therewith, a drum on and connected with said shaft, a disengageable feed mechanism for actuating said shaft to move the spindle in one direction, means tending to restrain such movement of the spindle by said feed mechanism and operable when the feed mechanism is disengaged to return the spindle rapidly, a brake device adapted to engage with said drum, and operating means for the brake device having a lost motion connection with the spindle whereby to apply said brake device at a predetermined point in the return movement of the spindle.

5. A brake mechanism for a drilling machine or the like having a tool spindle, means for reciprocating the spindle including a spring acting to move the spindle in one direction, and a shaft rotating with the spindle in the longitudinal movements thereof, said brake mechanism comprising a rotary element on said shaft, a brake member, and means operatively associated with the spindle adapted to apply the brake member to said rotary element at a predetermined point in the travel of the spindle when moved by said spring.

6. A brake mechanism for machine tool spindles comprising in combination with a spindle, a brake device movable in synchronism with the movements of the spindle, a brake member mounted for movement into and out of engagement with said device, and cam means movable with the spindle and operable at a predetermined point in the movement of the spindle to apply the brake member to the device.

7. A tool spindle brake mechanism comprising a brake drum rotatable in the movements of the spindle, a brake shoe, a supporting arm for said shoe, a rock shaft having a member on which said supporting arm is adjustably mounted, cam means operable automatically in the movement of the spindle to rock said shaft whereby to apply the brake member to the drum, and adjusting means between the cam means and the brake shoe to vary the time of applying the brake shoe.

8. A brake mechanism for tool spindles comprising, in combination, a brake drum rotatable in the movements of the spindle, a rock shaft, a brake member mounted on said shaft for movement toward and from said drum, and an arm adjustably splined on said shaft having a portion projecting into the path of movement of a part on the spindle whereby at a predetermined point in the movement of the latter the shaft is rocked to apply the brake member to said drum.

In testimony whereof, I have hereunto affixed my signature.

ALBERT M. JOHNSON.